United States Patent Office 3,112,192
Patented Nov. 26, 1963

3,112,192
PRESERVATION OF CUT FLOWERS
Edmund F. Feichtmeir, Ripon, and René Blondeau, Modesto, Calif., assignors to Shell Oil Company, New York, N.Y., a corporation of Delaware
No Drawing. Filed Sept. 19, 1960, Ser. No. 56,668
6 Claims. (Cl. 71—2.5)

This invention relates to a method for the preservation of cut flowers.

In the distribution and sale of cut flowers, the "life" of the cut flower is a primary factor in the marketability of that flower. By the "life" of a cut flower is meant the period of time from the first opening of the bud until the mature flower is clearly beginning to wilt.

We have discovered a method for extending the life of a cut flower. Further, our method controls the rate of maturation of a cut flower—that is, the rate at which the bud opens to form the mature flower—without otherwise affecting the maturation of the flower. Thus, our discovery not only effectively extends the life of the flower—increasing its marketability—but it also permits the flower to be cut while in the unopened bud—shipped from grower to wholesaler, and then to the retailer, while still in the bud, or before the bud has opened to form the mature flower, thus further extending the life of the flower, and this without adverse effect on the maturation and/or appearance of the flower.

Briefly, our method comprises treating the cut flower, preferably while still in the bud or in the early stages of maturation, with one or more of certain adenine compounds, which will be hereinafter described in detail. These adenine compounds are believed to so interact with the plant material as to slow proteolysis and other chemico-physiological processes which cause the flower to mature and then wilt and fade.

To cite a particular instance, we have discovered that if a flower spike of gladiolus is treated with one of these adenine compounds when the florets are in the tight bud stage, the time required for the buds to open into the mature florets is substantially extended, and the life of the mature florets is substantially extended, providing a large number of florets open at one time, while no significant adverse effect on the color or form of the florets was observed. In these tests, the life of the florets was extended from one to two days over the life of spikes not treated with the adenine compound.

The adenine compounds suitable for the preservation of cut flowers are those having the formula:

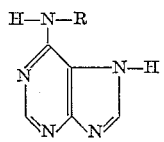

wherein R represents an aryl group, an aralkyl group or a heterocyclic group.

It will be appreciated that compounds of the above-formula can exist in the form of tautomeric isomers having the equivalent structures represented by the formulae:

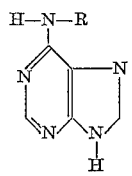

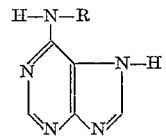

By the use of one of the two formulae, it is not intended to exclude the compounds of the other formula; particularly reference to one of the two formulae is not intended to exclude the presence of the tautomeric isomer in the material actually used to treat cut flowers according to this invention.

It is to be understood that it is the indicated structural configuration which has been found to impart activity to preserve cut flowers, and that accordingly the compounds which actively preserve cut flowers include those having this structural configuration containing one or more lower aliphatic substituents. The substitution will occur, of course, at one or more of the atoms in the 2-, 8- or 9- (equivalently, 7- in the tautomeric isomer) position of the rings, and the exocyclic nitrogen atom.

The character of these adenine compounds will be more clearly evident from the following detailed description.

The compounds are described by the two formulae because of the fact that the adenine precursors form tautomeric isomers in which the nitrogen double bond in the five-membered ring occurs at both the $N^7$- and $N^9$-nitrogen atoms, and because both types of compounds are equivalent in this invention. Broadly speaking, the suitable adenine compounds thus are compounds of the formulae:

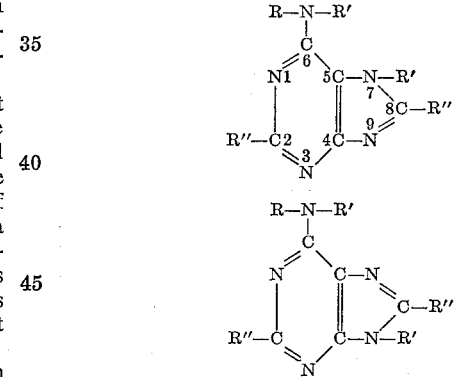

wherein R is, of course, aryl, aralkyl or heterocyclic. R' and R" can be hydrogen. Since the amides are suitable, R' can be acyl. Also, since the lower aliphatic substituted adenines of this kind are suitable for the purposes of this invention, one or more of R' and R" can be lower aliphatic.

Since R can be aryl, it suitably can be phenyl, hydrocarbon-substituted phenyl—such as biphenylyl, or an aliphatic-substituted phenyl radical, such as the mono- and poly(lower alkyl)phenyl radicals—or a phenyl radical substituted by one or more substituents. Since R can be aralkyl, it can suitably be the benzyl radical, the alpha-methylbenzyl radical, the phenethyl radical, the phenylbenzyl radical, mono- and poly(lower alkyl)benzyl radicals, or other hydrocarbon aralkyl radicals, or it can be aralkyl radical substituted by one or more non-hydrocarbon substituents. In those adenines wherein R is heterocyclic, it is preferred that the heterocyclic radical be monocyclic and contain in addition to carbon a single hetero oxygen atom, since these heterocyclic radicals impart improved solubility. Examples of such heterocyclic radicals are the furfuryl radical, the pyran radicals, and cyclic forms of sugar radicals, such as the pentoses, particularly the riboses, and the hexoses, wherein the attachment of the radical is from a carbon atom of the ring thereof to the exocyclic nitrogen atom of the adenine structure. Where the group R contains one or more non-hydrocarbon substituents, suitable substituents include for example halogen atoms, particularly chlorine or bromine, lower alkyloxy radicals, the carboxyl radical, lower alkyloxycarbonyl radicals, amino radicals, including —NH$_2$ and particularly the mono- and di(lower alkyl) amino radicals, the hydroxy radical, the nitro radical, the cyano radical, the mercapto radical, lower alkylthio radicals and the like. Those substituents containing oxygen are particularly of interest, since they tend to increase the water-solubility of the adenine compound containing them. Suitably, the group R can contain up to ten, or even more, carbon atoms. Because of the very high atoms. Because of the very high activity as preservatives for cut flowers that they exhibit, the adenines wherein R is unsubstituted aryl, aralkyl (i.e., aryl or aralkyl hydrocarbon) or carbon-oxygen heterocyclic are preferred.

Since the amides of these adenine compounds are suitable, R' suitably is acyl, for example, acyl containing up to ten carbon atoms, or even more. By acyl is meant the radical derived from an acid by removal of the hydroxyl group, and the acid and resulting acyl group can be either organic or inorganic in character. In the case of a carboxylic acid, $R_a$—C(O)—OH, the acyl radical is: $R_a$—C(O)—, while in the case of a sulfonic acid, $R_b$—SO$_2$—OH, the acyl radical is: $R_b$—SO$_2$—, while in the case of an inorganic acid such as nitrous acid, HO—NO, the acyl radical is —NO. Suitably the acyl radical may be that of a lower aliphatic carboxylic acid or sulfonic acid, the term "aliphatic" having the meaning set out herein, or the acyl radical may be that of an aryl carboxylic acid or sulfonic acid, including those wherein the acyl group is substituted by one or more non-hydrocarbon substituents. The acyl group may suitably be that of a lower aliphatic carbonic acid, an amino acid, a carbamic acid, phosphoric acid, or mono- or diester thereof, or a phosphonic or phosphinic acid, or their sulfur analogs, or a boric acid or mono- or diester thereof. The aliphatic acyl groups may be saturated or olefinically unsaturated.

R' and R'' can be lower aliphatic, for example, aliphatic up to eight carbon atoms, or more. The term aliphatic is herein intended to have its usual meaning: that is, an aliphatic radical is one which is essentially chain-like in configuration, as opposed to cyclic configuration. The aliphatic radicals represented by R' and R'' thus can be aliphatic hydrocarbon, they can be substituted hydrocarbon, or they can be hetero, with atoms other than carbon in the essential chain. Where the aliphatic radical is hetero, the atom joining the group to the adenine structure can be carbon, or it can be lower alkyl, alkenyl, alkynyl, alkadienyl, or the like, and of either straight-chain or branched-chain configuration, or they can be such groups substituted by one or more non-hydrocarbon substituents (examples of these substituents have already been set out). R' and R'' also can represent aralkyl groups. The adenine compounds of this invention wherein R' and R'' represent hydrogen or unsubstituted aliphatic radicals of from one to four carbon atoms exhibit very high activity as preservatives for cut flowers.

It is to be understood that while the adenines described herein are preservatives for cut flowers, the activity of individual species will vary, particularly as regards different species of flowers. By proper selection of the substituents, it is possible to obtain one or more of these adenine compounds which will best preserve a given species of flower. As a general rule, the preservative activity increases with decreasing molecular weight of the adenine compound. For this reason, certain subgenera of these adenine compounds are of primary interest. These subgenera include (a) that wherein the radical R is aralkyl, aryl or heterocyclic of up to ten carbon atoms, and the adenine structure is otherwise unsubstituted (R' and R'' are all hydrogen), of that subgenus those members wherein R is the benzyl radical being the most active; (b) that wherein the radical R is aralkyl, aryl or heterocyclic of up to ten carbon atoms, and a lower alkyl radical, preferably the methyl radical, is bonded to the carbon atom in the 8-position; and (c) the amides—wherein the radical R is aralkyl, aryl or heterocyclic of up to ten carbon atoms—and an acyl radical is bonded to at least one of: the exocyclic nitrogen atom or the nitrogen atom in the 7- or 9-position (at least one of R' is acyl).

These adenine compounds are amphoteric and readily form salts with both acids and bases. In some cases, it may be found preferable to employ a salt of a particular adenine rather than the adenine itself. This usually will occur where it is found desirable to change the solubility of the adenine compound.

These adenines will form salts with acids generally. Thus, the salts of such inorganic acids as the halogen acids, particularly hydrochloric acid and hydrobromic acid, can be formed, as can the salts of such acids as sulfuric acid, phosphoric acid and boric acid. Both complete salts and partial salts can be formed. The salts of organic acids can also be formed, examples of suitable acids being the aliphatic mono- and polycarboxylic acids (the alkane mono- and dicarboxylic acids of up to ten carbon atoms are preferred), including those which are substituted—as for example the halogenated acids, hydroxy-substituted acids, and the like—alkane and aryl sulfonic acids, phosphonic acids, phosphinic acids, phosphorous acid and its partial esters and the like.

The salts of bases include those of inorganic, as well as organic bases. Salts of alkali metal bases and alkaline earth metal bases are particularly suitable, other salts of inorganic bases being the ammonia salts and salts of polyvalent metals. Salts of organic bases, such as the amines, particularly mono-, di- and trialkyl amines and mono-, di- and trialkanolamines, are suitable, as are quaternary ammonium salts, sulfonium salts, phosphonium salts, salts of hetero nitrogen bases, and the like.

The adenines also form suitable salts with compounds which exist in the form of zwitterions, the salts of this type most suitable being the salts of the versene-type compounds—that is, salts of ethylenediamine tetraacetic acid and the like.

Examples of specific compounds employed for the purposes of the present invention are $N^6$-benzyladenine, $N^6$-phenyladenine, $N^6$-tolyladenine, $N^6$-furfuryladenine, $N^6$-benzyl-2-methyladenine, $N^6$-benzyl-8-methyladenine, $N^6$-phenyl-9-methyladenine and $N^6$-benzyl-7-methyladenine, $N^6$-benzyl-$N^6$-benzoyladenine, $N^6$-ethyl-$N^6$-benzyladenine, $N^6$-benzyl - $N^6$ - (p-toluenesulfonyl)adenine, $N^6$-phenyl-2-(methylthio)adenine, $N^6$-benzyl - $N^6$ - methyladenine, $N^6$-phenyl-2-ethyladenine, $N^6$-furfuryl-2-methyladenine, $N^6$-benzyl-8-isopropyladenine, $N^6$-phenyl-9-ethyladenine, $N^6$-benzyl-8-ethyladenine, $N^6$-(2-ribosyl) - 2 - methyladenine, $N^6$ - benzyl - $N^6$ - methylthioadenine, $N^6$-benzyl-$N^6$-acetyladenine, $N^6$-benzyl - $N^6$ - propionyladenine, $N^6$-phenyl-7-acetyladenine, $N^6$-benzyl - 9 - acetyladenine, $N^6$-(1-naphthyl)-$N^6$-nitrosoadenine, 6-(N-methyldimethylphosphoroamido)purine, $N^6$-(p-methylphenyl)-7-(methylsulfonyl)-adenine, $N^6$-benzyl-8-methyl-7-acetyladenine, $N^6$-phenyl-$N^6$-capryladenine, $N^6$-hexyl-8-methyl-7-acetyladenine, $N^6$-hexyl-8-methyl-9-acetyladenine, $N^6$-phenyl - $N^6$ - pentyl-9-(propylsulfonyl)adenine, $N^6$-benzyl-$N^6$-nitroso-2-(pentylthio)adenine, and the like.

Several procedures are available for the preparation of the $N^6$-substituted adenines employed for the purposes of the present invention. First, it is possible to replace the methylthio group of 6-(methylthio)purine with an amine. Next, if desired, adenine may be acylated and the resulting amide reduced. Third, the chlorine of 6-chloropurine may be replaced with a substituted amino group. The substituted adenines are conveniently prepared by a method which will depend to a great extent upon the position of the substituent group or groups.

Where the derivative is to be one wherein the exocyclic nitrogen atom of the adenine structure is to be bonded to two organic groups, and the adenine structure is otherwise unsubstituted as set out hereinbefore, the derivative is most conveniently prepared by reacting a 6-(alkylthio)-purine or a 6-halopurine with the appropriate secondary amine. The purines are known compounds, and the way in which these reactions are carried out is well known in the art.

Adenines substituted at the 9- (7-) position are readily prepared by reacting an alkali metal salt of the adenine with a halide of the desired substituent.

Adenines substituted at the 2-position are readily prepared by reacting the appropriately 2-substituted 4,5,6-triaminopyrimidine with an appropriate acid or acid anhydride, then reacting the resulting adenine with a carboxylic acid anhydride to form the corresponding $N^6$-amide, then reducing the amide with lithium aluminum hydride to the corresponding $N^6$- and 2-substituted adenine. As an alternative procedure, the adenine resulting from reaction of the diaminopyrimidine and the acid or acid anhydride can be reacted with the appropriate alcohol in the presence of strong base to alkylate the adenine at the exocyclic nitrogen atom, forming the desired $N^6$- and 2-substituted adenine.

Adenines substituted at the 8-position are readily formed in the same way as the 2-substituted adenines, using the appropriately substituted acid or acid anhydride.

The preparation of certain $N^6$-substituted adenines otherwise unsubstituted is shown in detail in copending application Serial No. 18,822, now Patent No. 3,013,885, while copending application Serial No. 18,892 shows in detail preparation of amides of $N^6$-substituted adenines, and copending application Serial No. 18,881 shows in detail preparation of $N^6$-substituted adenines which are also otherwise substituted. All of these copending applications were filed on March 31, 1960.

These adenine compounds preserve cut flowers generally, including, for example, carnations, violets, pansies, gladiolus, roses, snapdragons, chrysanthemums, dahlias, flags, Easter lilies, iris, gardenias, day lilies, daisies, anemones, asters, poppies, marigolds, cineraria, verbena, portulaca, cornflowers, sweet peas, primroses, coreopsis, pinks, gallardia, phlox, mignonette, bachelor buttons, daphne, geranium, larkspur, lilac, marguerite, peonies, petunias, scabiosa, daffodils, and the like.

The reason for the effectiveness of these adenines in prolonging cut flower life is not fully understood. The available evidence indicates that the adenine or adenines used react with the plant tissue, and delays both maturation of the bud to the mature flower, and senescence of the mature flower.

While the flower, or its bud, can be treated at any stage after the bud is ripe, the greatest preservative effect is usually obtained between the time the bud is in the "tight" stage—has not yet begun to open—until just before the bud begins to open to show color. However, flower life can be extended by treating the partly or fully opened flower. Generally, the longer the mature flower has been open, before treatment, the less the preservative effect.

The bud or flower can be treated with the adenine preservative in any one or more of a variety of ways. In general, it will be found most convenient to employ a liquid formulation of the preservative. The stem of the flower, the terminal cut being freshly made just prior to treatment, can be contacted with the liquid formulation, or the entire bud or flower, stem and all can be contacted with the liquid. Thus the stem can be immersed in the liquid, the entire bud or flower, stem, and leaves, if any, can be dipped or soaked in the liquid, or the liquid can be sprayed on the bud, flower, stem and leaves, if any. In some cases it may be found desirable—it will be effective—to spray the liquid on the plants before the flowers are excised therefrom. If desired, the flower may be rinsed with water after the treatment with the adenine formulation and/or it may be further treated as necessary to prevent attack by insects and/or by microorganisms such as fungi and bacteria.

The suitable adenine compounds can be formulated in a variety of ways. As has already been pointed out, it is usually most convenient to employ a liquid formulation. Any suitable solvent can be used, solvents such as alcohols (including glycols), esters, ketones, water and the like being suitable. The solvent of course must be one which does not adversely affect the flowers to be preserved. Water is ordinarily the cheapest and most easily handled, so it is a preferred solvent. In many cases, the alkali metal, particularly sodium, salt of the adenine compound is sufficiently soluble in water to permit use of a solution of the salt. In some cases it may be more convenient to employ an acid salt of the adenine which is soluble in a liquid other than water. For example, the salts of the adenine compounds with lower alkane carboxylic acids, particularly the acetic acid salts, are soluble in lower alcohols, particularly ethanol. In this latter, usually preferable, case, the adenine compound is dissolved in at least sufficient acetic acid to form the salt (an excess of acid can be used, if desirable) and the solution is diluted with ethanol. Since some water can be present, aqueous acetic acid solutions can be used, although it is preferred to maintain the water content low to prevent precipitation of the salt at low temperatures. It has been found that the stability of these solutions at low temperatures can be increased, if necessary, by increasing the acid concentration. Thus a mixture of 1.2 percent by weight of $N^6$-benzyladenine, 6.5 percent by weight acetic acid and 92.3 percent by weight ethanol has been found stable—i.e., none of the adenine salts precipitates—at temperatures above about 50° C. but tends to be somewhat unstable below those temperatures. Similar compositions which are stable to 32° F. or lower are formed by increasing the acetic acid concentration. For example, the acetic acid concentration can be increased to as much as 20 to 30 percent by weight, or even more, to increase the stability of the formulation. Formulations of excellent low-temperature stability can be prepared by using a glycol, such as propylene glycol, as solvent. With such a solvent, it is not always necessary to form a salt of the adenine compound, although in some cases it will be found desirable to add acetic acid to the formulation, thus forming at least in part the salt.

Alternatively, a solubilizing agent may be used, useful non-toxic solubilizing agents being the higher fatty acid monoesters of polyoxyethylene sorbitan, such as the monostearate ester and mixtures of the monostearate and monopalmitate esters.

Emulsifiers also can be added to improve the wetting properties of the formulation. Suitable non-toxic emulsifiers include the higher fatty acid monoesters of polyoxyethylene sorbitan already described as solubilizing agent, or higher fatty and monoesters of glycerine, such as glyceryl monostearate and glyceryl monooleate.

Other biologically active materials can be included in formulations of these adenines, provided these other materials do not adversely affect the flowers. Thus, fungicides, hormones, nutrients and/or other materials can be included to supplement the adenines.

The effective concentration of the adenine compound in the composition can vary considerably, in many cases the effective concentration depending upon the time of contact between the material to be treated and the composition, and/or the nature of the contact—whether only the stem of the bud or flower, or whether all of the bud or flower, is in contact with the composition. In many cases, as little as 5 parts by weight of the adenine compound per million parts by weight of the composition will have a definite effect upon the bud or flower to be treated. In other cases, as much as 1000 parts per million (by weight of the composition) of the adenine compound will be required. As a general matter, concentrations of from about 20 to about 200 parts per weight of the adenine compound per million parts by weight of the composition will be found optimum. Further, as a general matter, it is desirable to employ as low a concentration of the preservative as is possible to effect the desired prolongation of flower life, since this will minimize the possibility of damage to the flower by the preservative.

The effectiveness of these adenine compounds in preserving cut flowers is demonstrated by the following tests and their results.

*Example I*

Flower spikes of Leading Lady variety (Picardy sport) gladiolus were cut in very tight bud condition at 10 a.m. on day I. At 11:30, 96 spikes were sorted out for uniformity of size and bud development. At 12 noon, three bunches of 16 spikes each were placed in a vase of water. Three other bunches of 16 spikes each were left in the laboratory standing against the wall but not in water. ½ inch was cut off the bases of all 96 spikes at 1:45 and the following treatments were begun at 2 p.m., one bunch per treatment, all bunches put in water or solution at 2 p.m.

(1) Stems of wilted spikes placed in 4 inches of a solution of 75 parts per million by weight of $N^6$-benzyladenine in water for 30 minutes, then in water.

(2) Stems of wilted spikes placed in 4 inches of a solution of 75 parts per million by weight of $N^6$-benzyladenine in water for 2 hours, then in water.

(3) Stems of non-wilted spikes (kept in water 12 to 2 p.m.) placed in 4 inches of a solution of 75 parts per million by weight of $N^6$-benzyladenine in water for 2 hours, then in water.

(4) Control, wilted spikes.

(5) Control, non-wilted spikes.

(6) Control, non-wilted spikes, held in water in 40° F. refrigerator room for 2 hours (12–2 p.m.).

*Results.*—On a statistical basis, the treatments with benzyladenine resulted on day VIII in significantly fewer wilted florets, a significantly higher number of non-wilted plants per spike, and significantly fewer weak or floppy spike tips as compared to the controls, with the over-all conclusion that the treatment with $N^6$-benzyladenine had effectively extended the life of the gladiolus flowers by from 1 to 2 days.

*Example II*

Carnation blooms were cut from the plant and allowed to stand in air at room temperature without water for 4 hours on day I. They then were placed in test solutions. Five to six flowers were used in each test. The solutions used were:

(1) Pure water (control).

(2) $N^6$-benzyladenine—10 parts per million by weight in water.

(3) $N^6$-benzyladenine—30 parts per million by weight in water.

On day VII, all flowers had wilted in solution (1) while none had wilted in either solution (2) or (3).

From the foregoing description of the invention, it will be evident that the adenine compounds described herein effectively extend the life of cut flowers, whether in the bud or mature. As used herein, therefore, the term "flower" is intended to include all the forms thereof; the bud, whether tight or partly open, the partially developed and the mature bloom, and to include the stem and any leaves attached thereto.

We claim as our invention:

1. A process for extending the life of a cut flower comprising contacting said flower with a compound of the group consisting of the tautomeric isomers of the adenine compound having the structural formula:

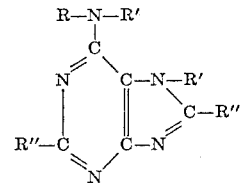

wherein R contains up to ten carbon atoms and is chosen from the group consisting of phenyl, lower alkyl-substituted phenyl, benzyl, lower alkyl-substituted benzyl, alpha-methylbenzyl, phenethyl, furfuryl, pyranyl, pentosyl, and hexosyl, R' is a member of the group consisting of hydrogen, lower alkyl, acetyl, benzoyl, p-toluenesulfonyl, propionyl, nitroso, methylsulfonyl, dimethylphosphoro, capryl and propylsulfonyl, and R" represents a member of the group consisting of hydrogen and lower alkyl, and salts of such compounds with hydrochloric acid, hydrobromic acid, sulfuric acid, phosphoric acid, boric acid, alkane mono- and dicarboxylic acids of up to ten carbon atoms, alkali metal bases, alkaline earth metal bases, ammonia, mono-, di- and trialkyl amines and mono-, di- and trialkanolamines.

2. A process according to claim 1 wherein the said compound is contacted with the flower when it is in the bud stage.

3. A process for extending the life of a cut flower comprising contacting said flower with $N^6$-benzyladenine in an amount sufficient to effectively extend the life of said cut flower.

4. A process for extending the life of a cut flower comprising contacting said flower with $N^6$-phenyladenine in an amount sufficient to effectively extend the life of said cut flower.

5. A process for extending the life of a cut flower comprising contacting said flower with $N^6$-1-naphthyladenine in an amount sufficient to effectively extend the life of said cut flower.

6. A process for extending the life of a cut flower comprising contacting said flower with $N^6$-furfuryladenine in an amount sufficient to effectively extend the life of said cut flower.

References Cited in the file of this patent

UNITED STATES PATENTS 2,653,087    Skoog                  Sept. 22, 1953
3,041,340    Bullock et al.           June 26, 1962